(12) United States Patent
Page et al.

(10) Patent No.: US 10,481,586 B2
(45) Date of Patent: Nov. 19, 2019

(54) NARROW ANGLE HOT END FOR THREE DIMENSIONAL (3D) PRINTER

(71) Applicant: Autodesk, Inc., San Rafael, CA (US)

(72) Inventors: James Sherwood Page, Berkeley, CA (US); Peter J. Schmehl, San Francisco, CA (US); Cory Mark Bloome, San Francisco, CA (US); Aljosa Kemperle, Brooklyn, NY (US)

(73) Assignee: Autodesk, Inc., San Rafael, CA (US)

( * ) Notice: Subject to any disclaimer, the term of this patent is extended or adjusted under 35 U.S.C. 154(b) by 401 days.

(21) Appl. No.: 15/222,668

(22) Filed: Jul. 28, 2016

(65) Prior Publication Data

US 2017/0072632 A1    Mar. 16, 2017

Related U.S. Application Data

(60) Provisional application No. 62/217,606, filed on Sep. 11, 2015.

(51) Int. Cl.
*B29C 64/20* (2017.01)
*G05B 19/4099* (2006.01)
(Continued)

(52) U.S. Cl.
CPC ........ *G05B 19/4099* (2013.01); *B29C 64/106* (2017.08); *B29C 64/20* (2017.08);
(Continued)

(58) Field of Classification Search
CPC .... G05B 19/4099; B29C 64/20; B29C 64/106
See application file for complete search history.

(56) References Cited

U.S. PATENT DOCUMENTS 5,303,141 A    4/1994 Batchelder et al.
5,316,219 A    5/1994 Christyson et al.
(Continued)

OTHER PUBLICATIONS

Unknown Author, "HYPECASK—Delta Tower," (Aug. 31, 2015) [online] (retrieved from http://hypecask.com/portfolio-item/deltatower/), 5 pages.
(Continued)

*Primary Examiner* — Jacob T Minskey
*Assistant Examiner* — Melody Tsui
(74) *Attorney, Agent, or Firm* — Fish & Richardson P.C.

(57) ABSTRACT

A hot end associated with an extruder for a Fused Filament Fabrication (FFF) three dimensional (3D) printer includes, in at least one aspect of the subject matter described in this specification: a heater; a temperature sensor coupled with the heater; an FFF material delivery channel; a heat sink coupled with the FFF material delivery channel; a nozzle coupled with the FFF material delivery channel and with the heater, the nozzle having a total included angle of less than or equal to sixty degrees and greater than or equal to ten degrees, with respect to a nozzle target point; and a cooling delivery system for at least the heat sink; where the heat sink, the heater, the temperature sensor, the FFF material delivery channel, the nozzle, and the cooling delivery system are all contained within a volume defined by the total included angle with respect to the nozzle target point.

20 Claims, 8 Drawing Sheets

(51) Int. Cl.
*B29C 64/106* (2017.01)
*B33Y 30/00* (2015.01)
*B33Y 40/00* (2015.01)

(52) U.S. Cl.
CPC .............. *B33Y 30/00* (2014.12); *B33Y 40/00* (2014.12); *G05B 2219/49023* (2013.01); *Y02P 90/265* (2015.11)

(56) References Cited

U.S. PATENT DOCUMENTS

| | | |
|---|---|---|
| 8,512,024 B2 | 8/2013 | Pax |
| 9,339,974 B2 | 5/2016 | Spalt |
| 2001/0017085 A1 | 8/2001 | Kubo et al. |
| 2010/0100224 A1 | 4/2010 | Comb et al. |
| 2011/0059256 A1 | 3/2011 | Ebisawa |
| 2014/0034214 A1 | 2/2014 | Boyer et al. |
| 2014/0070461 A1 | 3/2014 | Pax |
| 2014/0291886 A1 | 10/2014 | Mark et al. |
| 2014/0328963 A1 | 11/2014 | Mark et al. |
| 2014/0361460 A1 | 12/2014 | Mark |
| 2015/0093465 A1 | 4/2015 | Page |
| 2015/0108677 A1 | 4/2015 | Mark et al. |
| 2015/0266235 A1 | 9/2015 | Page |
| 2015/0266244 A1* | 9/2015 | Page ............ B22F 3/1055 425/78 |
| 2015/0324490 A1 | 11/2015 | Page |
| 2015/0367375 A1 | 12/2015 | Page |
| 2015/0367576 A1 | 12/2015 | Page |
| 2016/0271871 A1* | 9/2016 | Lee ............ B29C 48/02 |

OTHER PUBLICATIONS

Unknown Author, "Mechatronics Definition," (Jul. 24, 2015) [online] (retrieved from http://www.mcgs.ch/mechatronics_definition.html), 1 page.

* cited by examiner

NARROW ANGLE HOT END FOR THREE DIMENSIONAL (3D) PRINTER

CROSS-REFERENCE TO RELATED APPLICATIONS

This application claims the benefit under 35 U.S.C. § 119(e) of U.S. Patent Application No. 62/217,606, entitled "NARROW ANGLE HOT END FOR THREE DIMENSIONAL (3D) PRINTER", filed Sep. 11, 2015.

BACKGROUND

This specification relates to components of three dimensional (3D) printers, such as Fused Filament Fabrication (FFF) 3D printers.

3D printers employ additive manufacturing techniques, where a product can be built by the addition of materials. Various types of additive manufacturing techniques can be employed, including granular techniques (e.g., Selective Laser Sintering (SLS) and Direct Metal Laser Sintering (DMLS)) and extrusion techniques (e.g., FFF). In addition, various types of 3D printer structures are employed for 3D printing. For example, FFF 3D printers include both Cartesian (xyz) type 3D printers and delta type 3D printers. In typical Cartesian (xyz) type 3D printers, a carriage for a hot end for an extruder, and/or a build platform, is connected with rails that extend in the three different dimensions of printing (x, y & z). In contrast, in typical delta type 3D printers, a carriage for a hot end for an extruder is connected by arms with three rails that extend in only the z direction, and the carriage is moved in three dimensions by independently adjusting the positions of end points of the arms along the three rails.

SUMMARY

This specification describes systems and techniques relating to 3D printers, such as FFF 3D printers. In general, one or more aspects of the subject matter described in this specification can be embodied in a hot end associated with an extruder for a Fused Filament Fabrication (FFF) three dimensional (3D) printer, where the hot end includes: a heater; a temperature sensor coupled with the heater; an FFF material delivery channel; a heat sink coupled with the FFF material delivery channel; a nozzle coupled with the FFF material delivery channel and with the heater, the nozzle having a total included angle of less than or equal to sixty degrees and greater than or equal to ten degrees, with respect to a nozzle target point; and a cooling delivery system for at least the heat sink; where the heat sink, the heater, the temperature sensor, the FFF material delivery channel, the nozzle, and the cooling delivery system are all contained within a volume defined by the total included angle with respect to the nozzle target point.

The nozzle can be coupled with the FFF material delivery channel through a connector configured to receive different types of nozzles, and the connector can also be contained within the volume defined by the total included angle with respect to the nozzle target point. The hot end can include a thermal barrier coupled with the heat sink and the FFF material delivery channel, where the thermal barrier is also contained within the volume defined by the total included angle with respect to the nozzle target point, and the cooling delivery system can include air ducting configured and arranged to direct blown air to both the heat sink and material extruded by the nozzle.

The total included angle with respect to the nozzle target point can be less than or equal to sixty degrees and greater than or equal to thirty degrees. The hot end can include a fan to generate the blown air for the cooling delivery system, where the fan is also contained within the volume defined by the total included angle. The hot end can include a motor to drive FFF filament into the FFF material delivery channel, where the motor is also contained within the volume defined by the total included angle.

The nozzle has an exit orifice with a size, and the volume can be that of a cone defined by the total included angle and a cone height between fifty times and two hundred and fifty times the size of the exit orifice. The total included angle can be less than or equal to forty five degrees and greater than or equal to thirty degrees. The hot end can include a thermal barrier, where the thermal barrier is also contained within the volume defined by the total included angle with respect to the nozzle target point. The cooling delivery system can include air ducting configured and arranged to direct blown air to both the heat sink and material extruded by the nozzle.

The air ducting can include separate air ducts for the heat sink and the material extruded by the nozzle, the separate air ducts being configured and arranged to receive blown air at different flow rates from different fans. The cooling delivery system can be configured and arranged to cool both the heat sink and the thermal barrier. The cooling delivery system can include a heat pipe, a liquid cooled system, or combination of these.

One or more aspects of the subject matter described in this specification can also be embodied in an extruder for a FFF 3D printer including: a heat sink; a thermal barrier coupled with the heat sink; a heater coupled with the thermal barrier; a temperature sensor coupled with the heater; an FFF material delivery channel; a motor to drive FFF filament into the FFF material delivery channel; a nozzle coupled with the FFF material delivery channel and with the heater, the nozzle having a total included angle of less than or equal to sixty degrees and greater than or equal to ten degrees, with respect to a nozzle target point; and a cooling delivery system for at least the heat sink; where the heat sink, the heater, the temperature sensor, the FFF material delivery channel, the nozzle, and the cooling delivery system are all contained within a volume defined by the total included angle with respect to the nozzle target point.

The hot end of the extruder can include various combinations of the features described herein. Further, the thermal barrier and the motor of the extruder can also be contained within the volume defined by the total included angle with respect to the nozzle target point. The total included angle for the extruder can be less than or equal to forty five degrees and greater than or equal to thirty degrees.

One or more aspects of the subject matter described in this specification can also be embodied in a FFF 3D printer including: a build platform; a 3D printer motion system; a carriage coupled with the 3D printer motion system; and a hot end coupled with the carriage; where the hot end includes a heater, a temperature sensor coupled with the heater, an FFF material delivery channel, a heat sink coupled with the FFF material delivery channel, a nozzle coupled with the FFF material delivery channel and with the heater, and a cooling delivery system for at least the heat sink; where the nozzle has a total included angle of less than or equal to sixty degrees and greater than or equal to ten degrees, with respect to a nozzle target point; and where the heat sink, the heater, the temperature sensor, the FFF material delivery channel, the nozzle, and the cooling delivery system are all contained within a volume defined by the total included angle with respect to the nozzle target point.

The hot end of the FFF 3D printer can include various combinations of the features described herein. Further, the carriage can also be contained within the volume defined by the total included angle with respect to the nozzle target point. In addition, the 3D printer motion system can have more than three degrees of freedom, and the FFF 3D printer can be configured to move the carriage and the hot end along three dimensional tool paths.

Particular embodiments of the subject matter described in this specification can be implemented to realize one or more of the following advantages. The hot end for a 3D printer can be designed with one or more specific volume profiles that facilitate the 3D printing to be performed using the hot end. By designing the hot end to have a narrow profile, an increased ability to "plunge" into deep caverns or holes in a part being 3D printed can be achieved. This can facilitate 3D printing that is less dependent on the use of two dimensional (2D) tool paths (in each respective flat slice of the object being printed) and can more readily generate and use 3D tool paths. For example, one or more specific volume profiles for one or more hot ends can result in increased ability to 3D print adjacent to existing objects, which may be 3D printed objects or otherwise. Further, a better ability to 3D print on more steeply pitched (non-perpendicular to nozzle) surfaces can be achieved in various implementations.

Moreover, the systems and technique described in this specification are applicable to many different types and sizes of 3D printer, and tailoring of the hot end design to different 3D printers can result in unique volume definitions for each hot end. Such different hot ends can have their volume definitions created to facilitate the specific type of 3D printing that will be done with the hot end (e.g., based on FFF material, nozzle aperture, and desired "plunge"), and these different hot ends can be used with a single 3D printer or with different 3D printers, which can work together on the same object being 3D printed. For example, the systems and techniques described herein can be implemented in combination with the Multi-Tool Manufacturing System described in U.S. Application No. 62/217,452, filed Sep. 11, 2015, which application is hereby incorporated by reference in its entirety.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
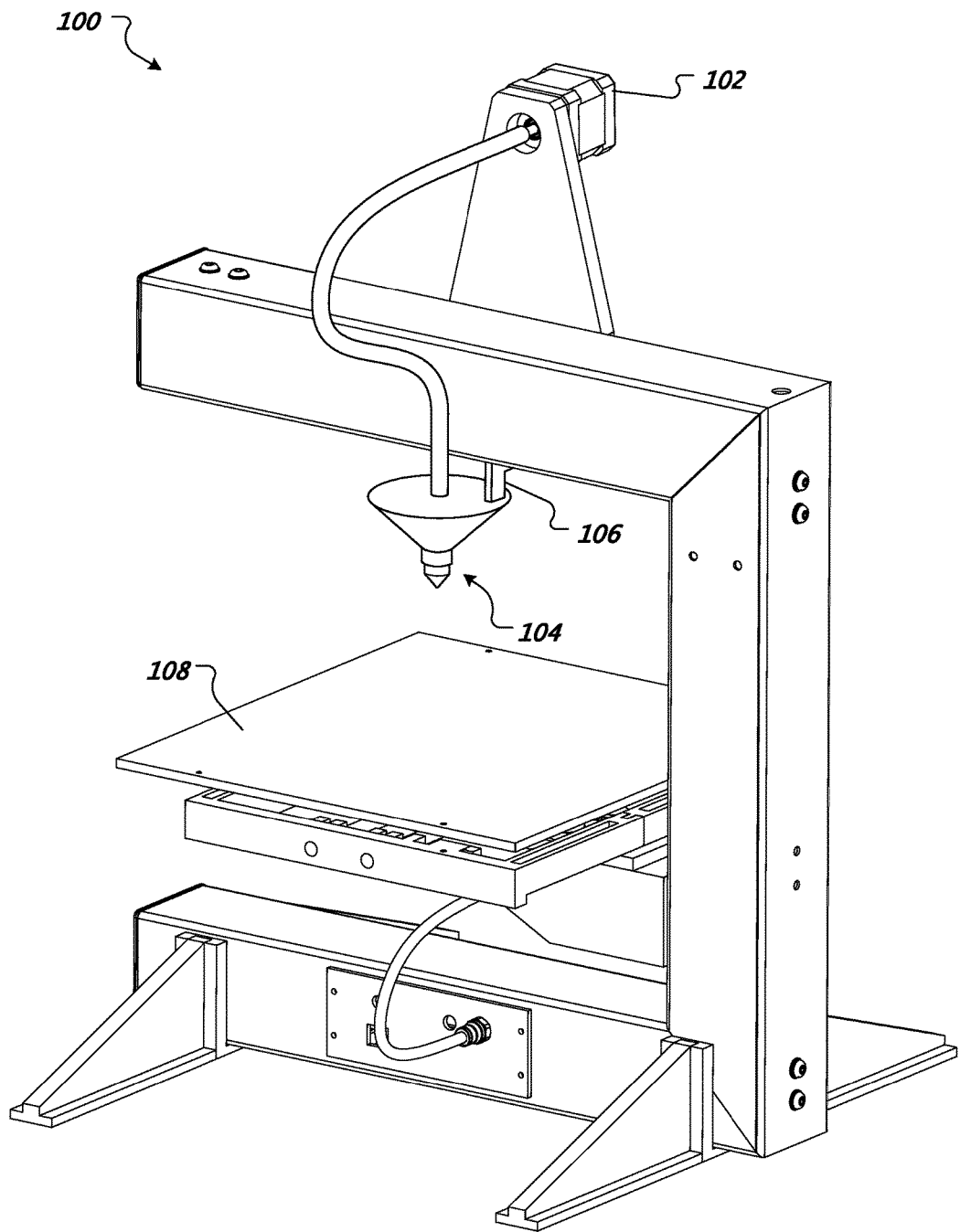
FIG. 1A is an isometric view showing an example of a Cartesian (xyz) type 3D FFF printer in accordance with some implementations.

FIG. 1A is an isometric view showing an example of a Cartesian (xyz) type 3D FFF printer 100 in accordance with some implementations. The 3D printer 100 includes an extruder assembly, which includes an extrusion motor 102 to drive filament to a hot end 104 that connects to a carriage 106. The carriage 106 is moveable in a first direction (x) along a fixed arm of the 3D printer 100, and the additional two directions of movement are achieved by a build platform 108 being moveable in two additional directions (y & z). As will be appreciated, there are many types of motion system structures that can be used to create a Cartesian (xyz) type 3D FFF printer, and the hot end 104 can be used with all such variations in the 3D printer, including different systems in which the hot end is not considered part of the extruder.

In general, an extruder is a group of parts that handles feeding and extruding the build material. The extruder can be viewed as including two assemblies: (1) a cold end that pulls/feeds the filament (e.g., thermoplastic from a spool), and (2) a hot end that melts and extrudes the filament (e.g., thermoplastic melted at temperatures of up to 240° C.). As will be appreciated, the hot end 104 needs to be constructed so as to withstand the high temperatures used to melt the build material. In addition, the hot end 104 needs various systems (e.g., a thermocouple or thermistor, a heater, and an actively controlled fan) to control the temperature of the hot end 104 with precision. As shown in FIG. 1, the hot end 104 has been constructed so as to keep these upstream components within a narrow cone extending from the nozzle tip back upstream (i.e., opposite the filament feed direction). This narrow profile for the hot end 104 can provide significant advantages in operation of a 3D printer.

Figure 1B:
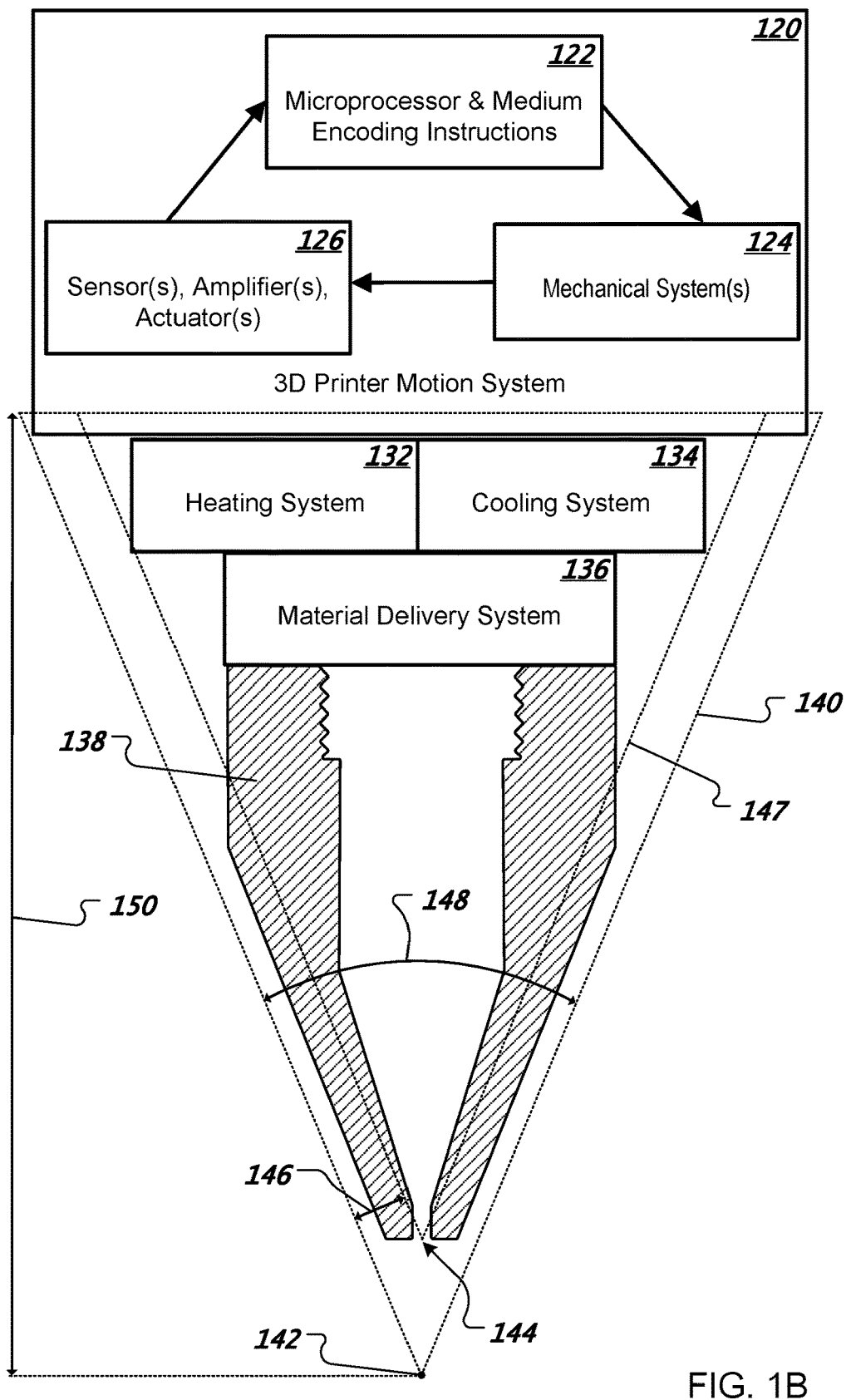
FIG. 1B is a schematic diagram showing definition parameters for a total included angle, with respect to a nozzle target point, in association with the general parts of various types of 3D printers.

FIG. 1B is a schematic diagram showing definition parameters for a total included angle, with respect to a nozzle target point, in association with the general parts of various types of 3D printers. While the specific structures are different in different types of 3D printers, each 3D printer includes a 3D printer motion system 120. The 3D printer motion system 120 operates to move the carriage (and thus the hot end) in relation to the 3D build volume. Thus, the 3D printer motion system 120 can include at least one controller and an input/output (I/O) subsystem.

In some implementations, the 3D printer motion system 120 includes at least one processor and medium encoding instruction 122 (e.g., a microprocessor with embedded firmware), one or more mechanical systems 124 (e.g., to physically move the carriage, the build platform, or both), and one or more sensor(s), amplifier(s), and actuator(s) 126. Thus, the 3D printer motion system 120 can be a mechatronic system, which monitors the build environment and/or the 3D printer using sensors, and processes the sensor information in order to change the behavior of the system so as to react to changes in the build environment and/or the 3D printer itself. In this case, the encoded instructions (e.g., software) has become an integral element of the 3D printer, allowing the 3D printer to identify and react to situational changes that can occur during 3D printing.

In some implementations, the 3D printer motion system 120 includes one or more portions of the extruder. For example, the system 120 can include the extrusion motor, filament drive mechanism, or both. In any case, the 3D printer motion system 120 causes movement of the hot end in relation to the build volume, and so these motions are coordinated with the melting and extruding done at the hot end.

The hot end includes at least a portion of a heating system 132. For example, the heating system 132 can include a temperature sensor and an electric heater. The hot end includes at least a portion of a cooling system 134 (e.g., air cooled, liquid cooled, or both).

For example, the cooling system 134 can include a heat sink and a cooling delivery system (e.g., air ducting for blown air, one or more fans, one or more heat pipes, or a combination of these) for cooling the heat sink and a nozzle 138 (the nozzle 138 is shown in cross-section in the schematic of FIG. 1B) and/or the material dispensed by the nozzle 138. In addition, a material delivery system 136 (e.g., an FFF material delivery channel defined by a filament guide tube and a thermal barrier) connects the nozzle 138 with the upstream components. Note that in some implementations, a 3D printer can be designed to have as little coupling between the heater and the heat sink as possible; the heat sink is included to help remove undesirable heat that travels up to the region above where liquification of the printer material happens.

In addition, although the heating system 132, the cooling system 134, and the material delivery system 136 are shown as distinct boxes in the schematic of FIG. 1B, it will be appreciated that these structures can overlap with each other. The particular arrangement of these boxes for the subsystems of the 3D printer is not important in general, except in that it shows that at least portions of these 3D printer subsystems are contained within a volume 140 (shown in this example as a triangle in FIG. 1B to represent the cross section of a cone). The volume 140 is defined with reference to a nozzle target point 142.

The nozzle target point 142 is a point in 3D space to which the nozzle 138 points. The nozzle target point 142 is in the direction that melted material exits the aperture 144 of the nozzle 138 (ignoring the effects of gravity in relation to the orientation of the nozzle 138). Further, a total included angle 148 of the volume 140 is adjusted, and the nozzle target point 142 is distanced from the aperture 144 of the nozzle 138 by a sufficient amount, such that the volume 140 includes the nozzle 138 in its entirety. Moreover, in some cases, the nozzle target point 142 is distanced from the aperture 144 a bit farther to create an extra space between an outer edge of the nozzle 138 and the surface of the volume 140. In some implementations, this extra space is an offset 146 that is measured from a cone 147 whose apex is the center of the aperture 144 at the most downstream point in the nozzle. In addition, in some implementations, the offset 146 is set so as to be generally equal to the size of the aperture 144 (e.g., offset 146=diameter of aperture 144, offset 146=a longest dimension of aperture 144, or offset 146=diameter of a circle having the same area as the aperture 144). Note that the exit orifice shown has a round aperture 144 and a flat section immediately adjacent the aperture 144 at the tip of the nozzle 138, but other exit orifice shapes and other nozzle tip shapes are also possible.

Thus, the total included angle 148 is defined with respect to the nozzle target point 142. In various implementations, the total included angle 148 can range from 10 to 60 degrees, inclusive. In some implementations, the total included angle 148 can range from 10 to 45 degrees, inclusive. In some implementations, the total included angle 148 can range from 30 to 60 degrees, inclusive. In some implementations, the total included angle 148 can range from 30 to 45 degrees, inclusive. In some implementations, the total included angle 148 can range from 20 to 45 degrees, inclusive.

The offset 146 can also vary with implementation, but it will generally be set to match the aperture of the nozzle. In addition, one or more portions of the heating system 132, the cooling system 134, and the material delivery system 136 are designed to fit within the volume 140. As these system components are moved closer to the nozzle, there is less space in which to fit them since available amount of volume 140 diminishes rapidly with proximity to the nozzle target point 142. In some implementations, the total included angle 148 can be adjusted based on how close the upstream components need to come to the nozzle 138 and based on how narrow of a profile the hot end needs for the planned application.

In some implementations, the height 150 is adjusted for the volume to provide more or less space for the components upstream of the nozzle 138. In addition, the height 150 will change with implementation in light of the size of the hot end. In general, the height 150 will vary between fifty and two hundred and fifty times the size of the aperture 144 (e.g., between fifty and two hundred and fifty times the greatest linear dimension of the exit orifice).

In some implementations, a set of hot end components are specifically designed to fit within a defined volume 140, where the total included angle 148 and any offset 146 have been selected in accordance with the specific application(s) for the hot end of the 3D printer being designed (e.g., in view of how much "plunge" capability is desired). In some implementations, the set of hot end components contained by the volume 140 includes the nozzle, a heater, a temperature sensor, an FFF material delivery channel, a heat sink, and the cooling delivery system. Note that the cooling delivery system can be a full cooling system (e.g., including a fan) or a portion of the full cooling system (e.g., air ducting) that delivers cooling to (or removes heat from) the hot end. Other upstream components that can be designed to be contained within the defined volume 140 can include one or more components of the 3D printer motion system 120, such as a motor to drive FFF filament into the FFF material delivery channel, other portions of mechanical system(s) 124, portions of sensor(s), amplifier(s), and actuator(s) 126, one or more processor(s) and medium(s) 122, or combinations of these.

Figure 1C:
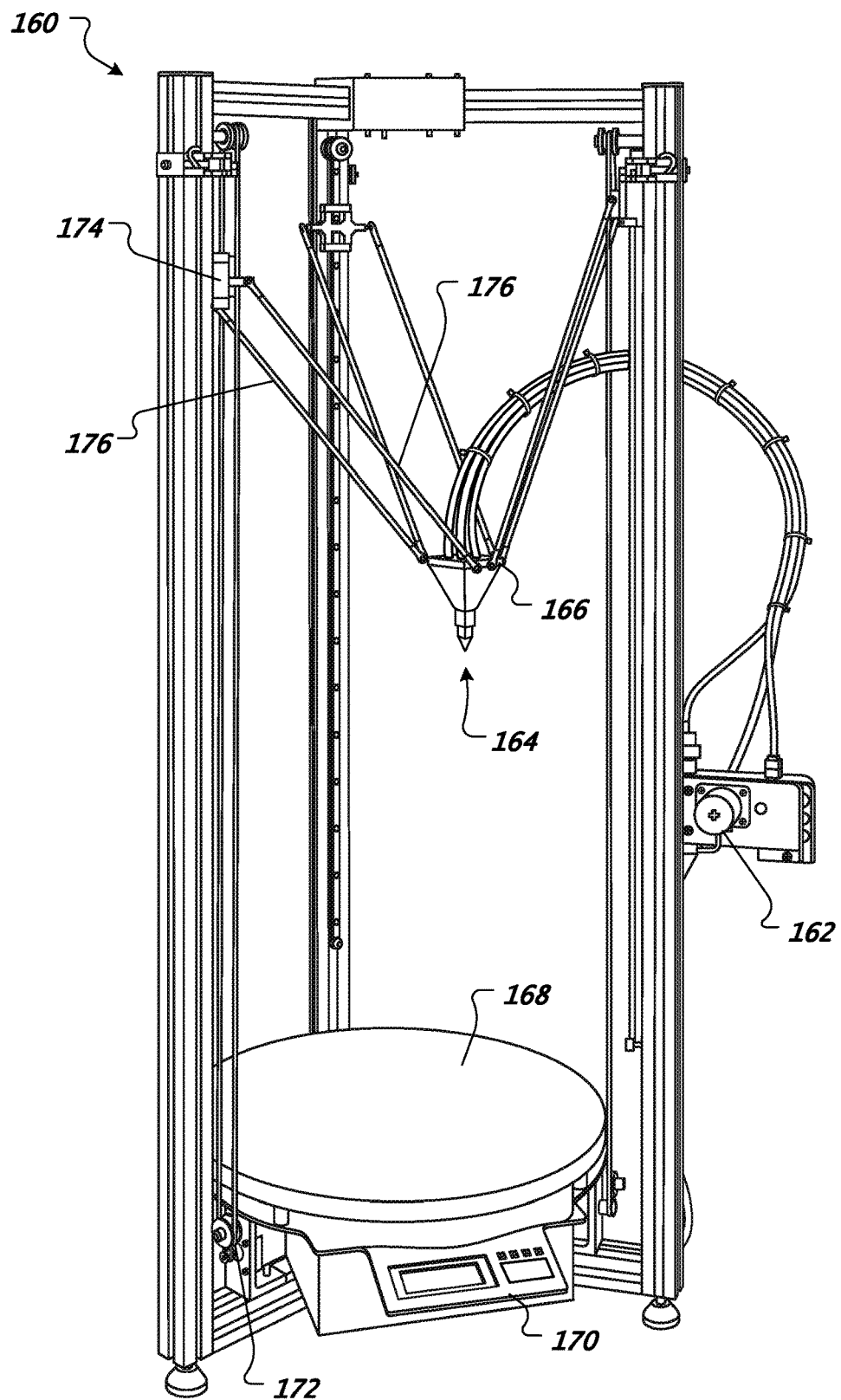
FIG. 1C is an isometric view showing an example of a delta type 3D FFF printer in accordance with some implementations.

The hot end design techniques and systems described above are useable with many different types and sizes of 3D printers. FIG. 1C is an isometric view showing an example of a delta type 3D FFF printer 160 in accordance with some implementations. The delta printer 160 includes FFF drive motor 162, which drives filament material to a narrow hot end 164. As shown, the volume that contains the hot end components need not be a cone. In this case, a faceted cone has been used. Other types of volumes can also be used, depending on the specific 3D printing application. Further, as shown, a carriage 166 that holds the hot end 164 can also be contained within the volume defined by the total included angle with respect to the target nozzle point. This can facilitate further "plunge" capability in the delta 3D printer 160 when printing an object on the build platform 168.

The delta 3D printer 160 includes a motion system, which includes a controller 170, a rail motor assembly 172, a rail cart 174, and arms 176. The controller 170 can be computer hardware programed with software, or dedicated circuitry, such as an ASIC (application-specific integrated circuit), that performs 3D printing in accordance with the systems and techniques described in this specification. Note that other parts of the motion system can be included within the defined volume of the hot end 164, including mechanical structures that move the hot end and/or its carriage and mechanical structures that feed FFF material (e.g., FFF drive motor 162 can be included on the carriage 166 and be within the defined volume).

Figure 2A:
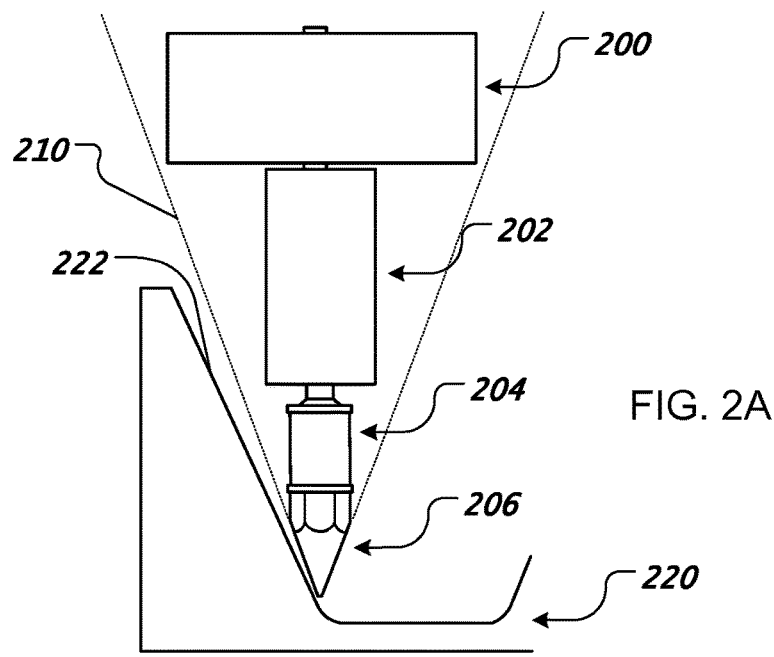
FIG. 2A is a side view of a narrow hot end showing an example of a process of 3D printing an object.

FIG. 2A is a side view of a narrow hot end showing an example of a process of 3D printing an object 220. The narrow hot end is attached to a carriage 200 and is associated with an extruder (the cold end of the extruder is not shown). The narrow hot end includes a thermal barrier and/or heat sink 202, a heater 204, and a nozzle 206, all of which are contained within a volume 210 defined with reference to a nozzle target point of the nozzle 206. In addition, in this example, the carriage 200 has also been designed to be contained within the volume 210.

As shown in FIG. 2A, the narrow profile (of the volume 210) for the hot end allows it to extrude FFF material while moving along a steep side 222 of the object 220. The narrow profile allows the hot end to extrude FFF material at a deeper part of side 222 without causing the upstream components of the hot end to crash into a higher part of the side 222. The narrow nature of the hot end thus enables the use of more types of 3D tool paths when building an object 220.

Figure 2B:
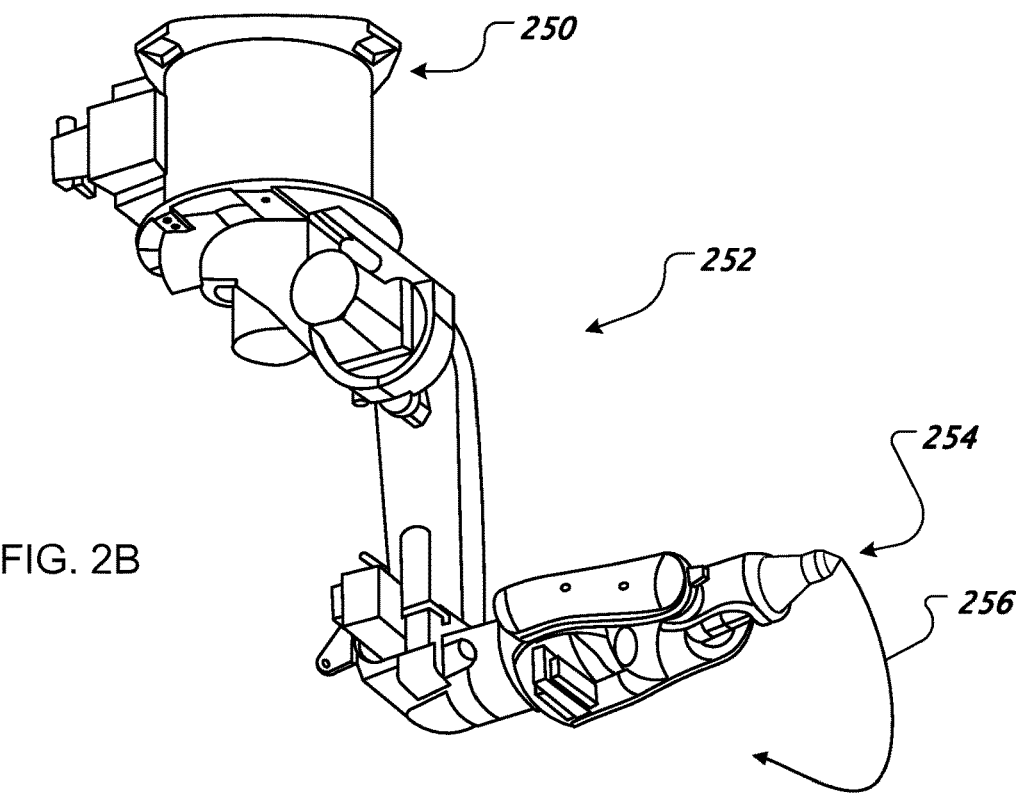
FIG. 2B is an isometric view showing an example of a robot arm, which can be used as part of a motion system for a hot end to provide more than three degrees of freedom of movement of the hot end.

In addition, the hot end design need not be limited to the benefits achievable in the vertical direction, which can have significant value in 3D printers. FIG. 2B is an isometric view showing an example of a robot arm, which can be used as part of a motion system for a hot end to provide more than three degrees of freedom of movement of the hot end. A carriage 250 can be attached to various types of 3D printers, a robot arm 252 can provide three or more rotation and/or translation mechanisms to move a narrow hot end 254 into a wide variety of positions and orientations. These additional degrees of freedom can enable the creation of a wide variety of 3D tool paths, such as a 3D tool path 256 generated by moving the carriage 250 and the robot arm 252 to precisely control the locations and speed(s) along the 3D tool path 256.

The generation and use of 3D tool paths, in light of the design features of the hot end, can be performed by one or more programmable processors executing one or more computer programs encoded in a non-transitory medium to perform functions by operating on input data and generating output. Such one or more programmable processors executing one or more computer programs can be controller 170 in FIG. 1C, or a separate computer system, which can be connected with the 3D printer by wired or wireless link, e.g., WiFi. A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment.

A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network. In addition, the processes that can be performed by computer programs can also be performed by, and apparatus can also be implemented as, special purpose logic circuitry, e.g., an FPGA (field programmable gate array) or an ASIC (application-specific integrated circuit).

Figure 3A:
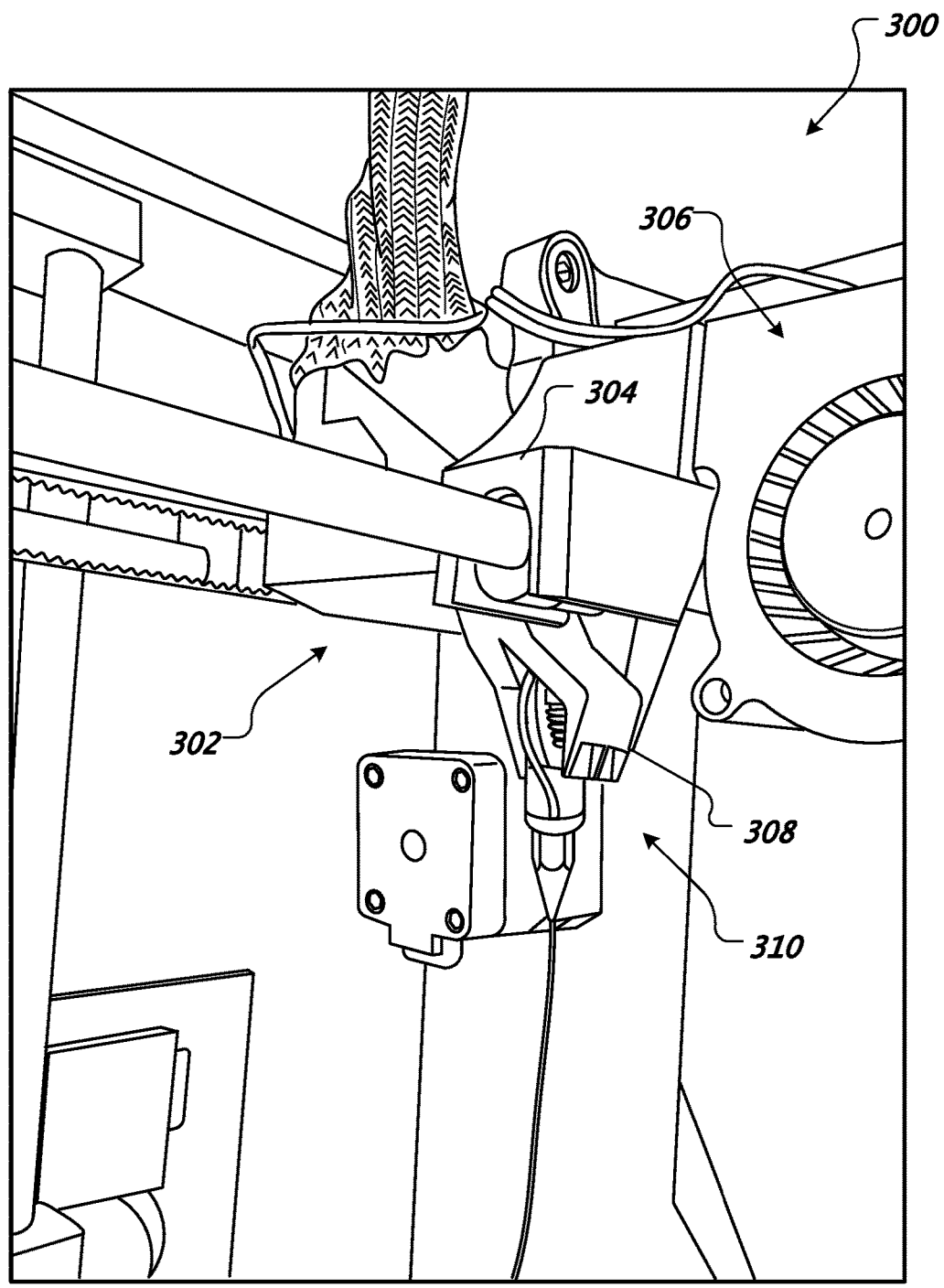
FIG. 3A is an isometric view of a portion of a 3D FFF printer showing an example of a narrow hot end installed therein.

Furthermore, as noted above, various numbers (and amounts) of the upstream components can be designed to be contained by the hot end's defined volume. FIG. 3A is an isometric view of a portion of a 3D FFF printer 300 showing an example of a narrow hot end 310 installed therein. The 3D FFF printer 300 includes a 3D printer motion system 302 used to move a carriage 304 to build an object. The 3D FFF printer 300 includes one or more fans 306, which can generate blown air for a cooling delivery system, which can provide separate cooling flows to separate components of the hot end 310 (e.g., an air duct 308 to direct air from fan 306 onto the nozzle extruding FFF material).

In the example shown, the one or more fans 306 are attached to (and move with) the carriage 304. In some implementations, the one or more fans 306 are mounted vertically above the carriage and are also contained within the volume defined by the total included angle used for the nozzle of the hot end 310. In other implementations, one or more of the one or more fans 306 (or other cooling system components) can be located separate from the carriage.

Figure 3B:
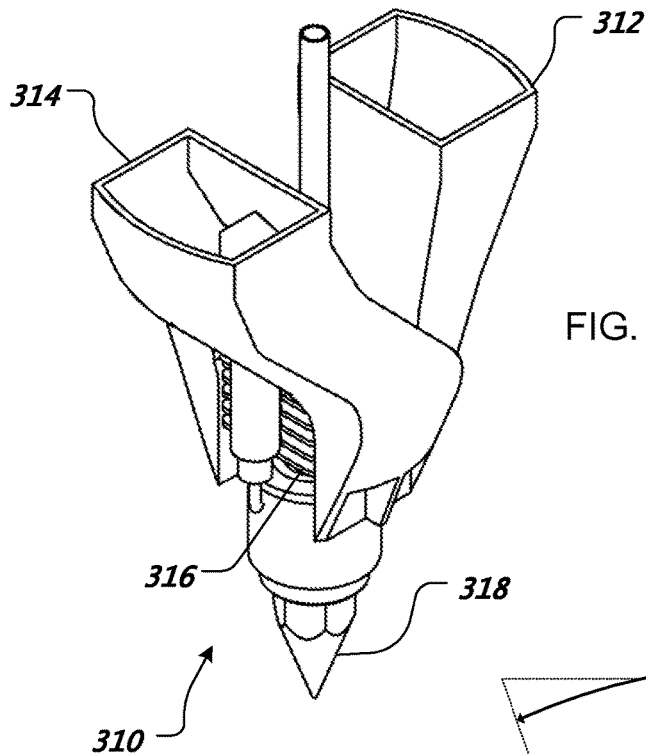
FIG. 3B is an isometric view of the narrow hot end extracted from the 3D FFF printer in FIG. 3A.

FIG. 3B is an isometric view of the narrow hot end 310 extracted from the 3D FFF printer 300 in FIG. 3A. The hot end 310 includes a first air duct 312 and a second air duct 314 which connect (or interface) with other ducting (fixed or flexible) that receives air from one or more fans 306. The hot end 310 includes a heat sink 316 and a nozzle 318, and the first and second air ducts 312, 314 form a cooling delivery system for the hot end 310. In addition, the first and second air ducts 312, 314 can be separate from each other (providing independent air channels) and shaped/directed (e.g., as shown) to direct blown air to both the heat sink 316 and the material extruded from the nozzle 318.

Note that actively controlled independent fans can have their outflows coupled with separate first and second air ducts 312, 314 so as to provide independent control of the cooling of the different elements in the 3D printer. Thus, separate air ducts 312, 314 can receive blown air at different flow rates from different fans and direct these different cooling flows to different components of the hot end 310. In the example shown, the air duct 314 splits into two channels, each of which is then divided vanes to ensure even cooling of the surface of the 3D print. But it will be appreciated that there are other ways to achieve even cooling, and in some implementations, even cooling is not necessary.

Figure 3C:
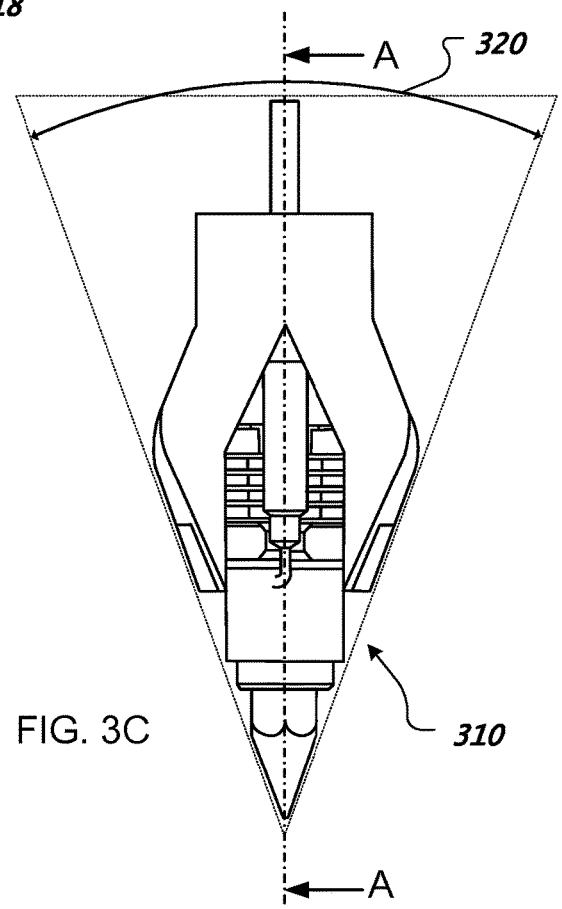
FIG. 3C is a side view of the narrow hot end from FIG. 3B.
Figure 3D:
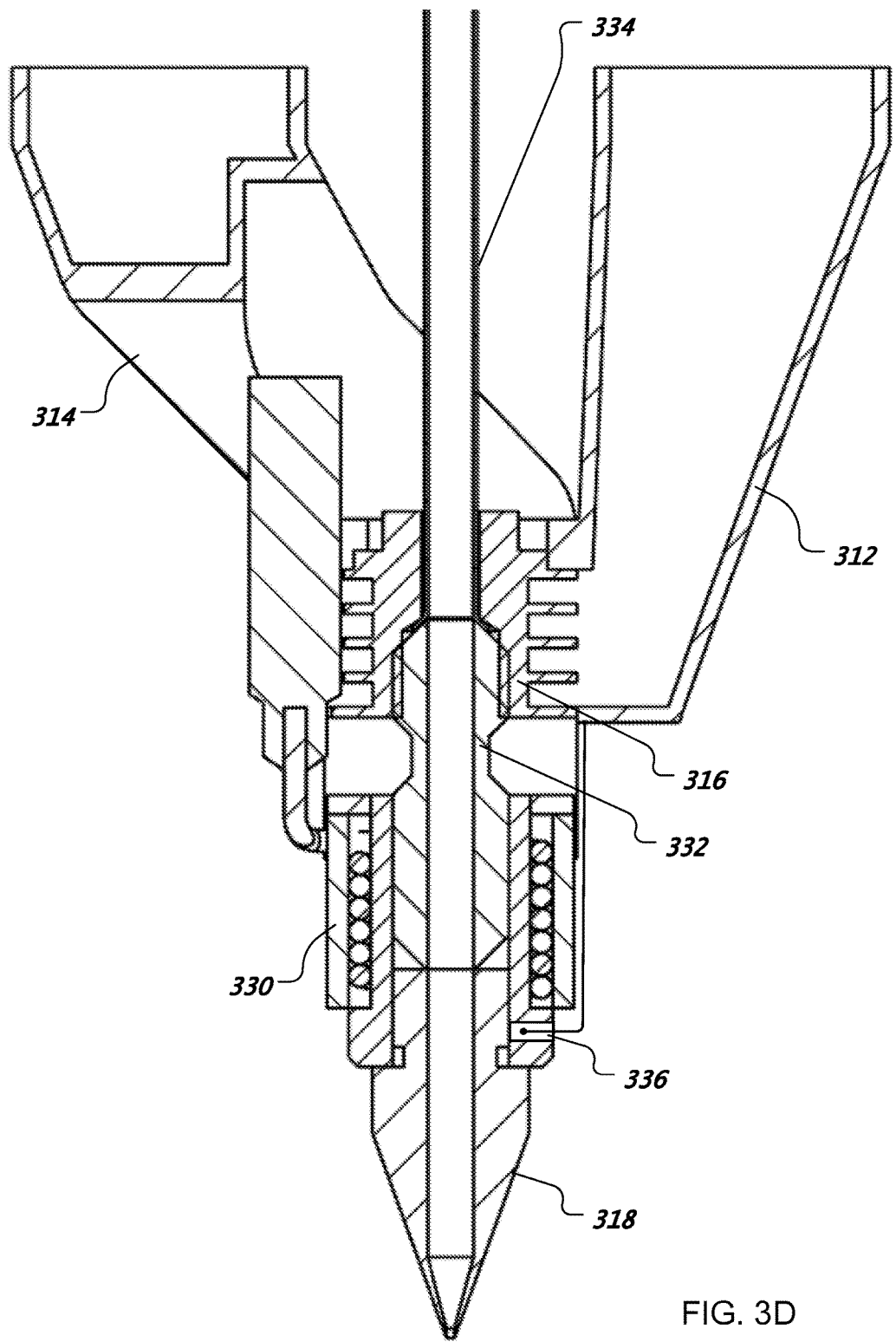
FIG. 3D is a cross-section view of the narrow hot end from FIG. 3C.

All of these components, including the air ducts 312, 314, the heat sink 316, and the nozzle 318, can be kept within a total included angle defined for the extruder that uses the hot end 310. FIG. 3C is a side view of the narrow hot end 310 from FIG. 3B. As shown, all of the components of the hot end 310 are contained within a cone having a total included angle 320, which in this example is about 40 degrees (where "about" means +/−5%, +/−%, or +/−1%). Also shown in FIG. 3C is cross-section line A. FIG. 3D is the cross-section view of the narrow hot end 310 from FIG. 3C.

The components included within the volume defined by the total included angle for the hot end 310 include, in addition to the nozzle 318, the heat sink 316, and the cooling delivery system 312, 314, a heater 330, a thermal barrier 332, a guide tube 334 for the FFF material, and a temperature sensor 336 (e.g., a thermocouple placed in a hole in the heater 330 and a thermocouple cable extending back from the nozzle 318; other types of temperature sensors and/or locations for such are also possible). As shown, the thermal barrier 332 separates and is partially contained by the heater 330 and the heat sink 316, and the thermal barrier 332 is also contained within the volume defined by the total included angle for the hot end 310. As shown, air duct 312 provides air cooling directly to the heat sink 316. In some implementations, air duct 312 can also provide air cooling to the thermal barrier 332, or another air duct can provide air cooling to the thermal barrier 332. Thus, one or more of the heat sink 316, the thermal barrier 332, the heater 330, the nozzle 318, and the filament, can be cooled (potentially independently) by one or more separate parts of a cooling delivery system (e.g., water cooling for the heat sink and air cooling for the material extruded by the nozzle) that is contained within the volume defined by the total included angle for the hot end 310.

Figure 3E:
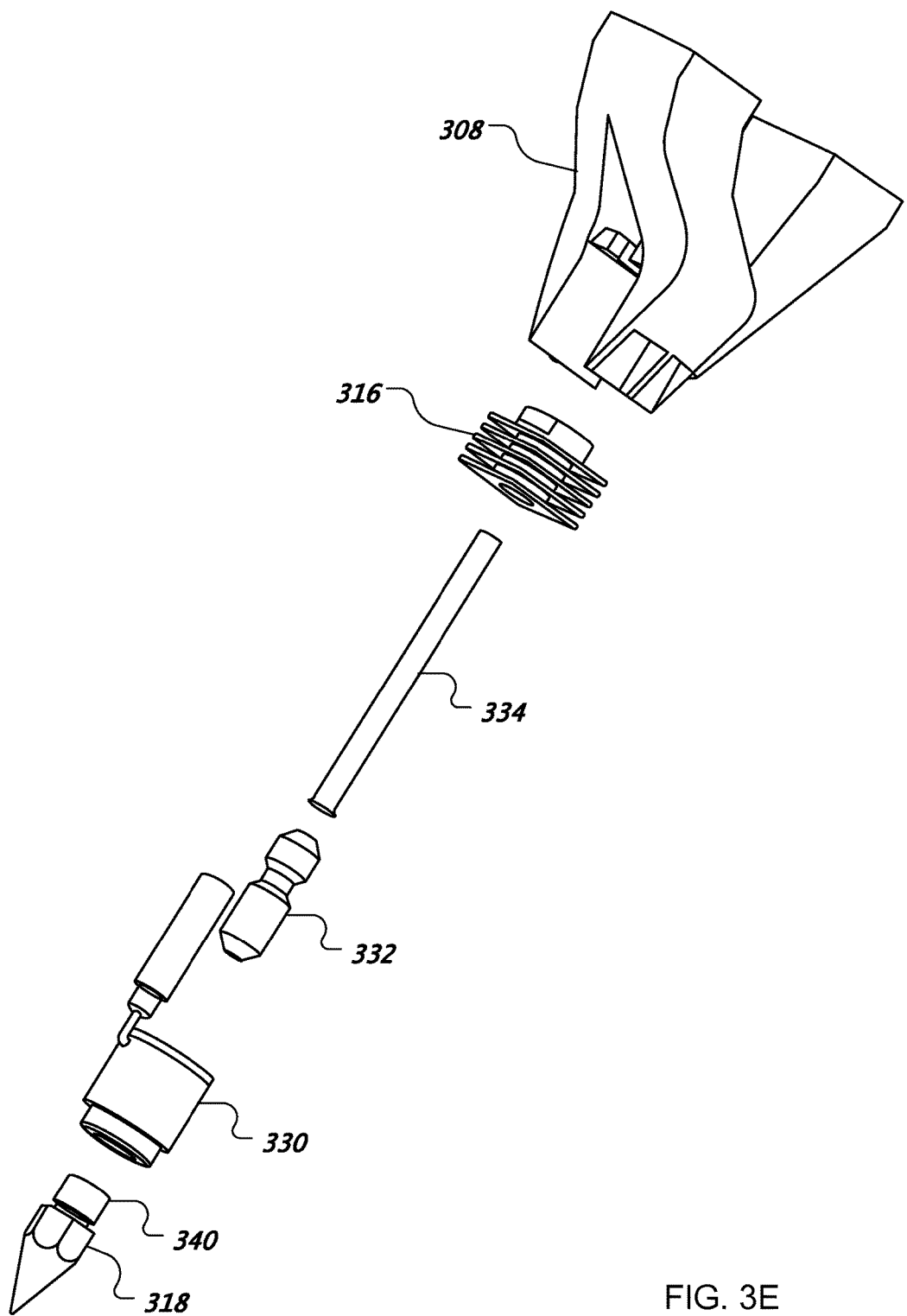
FIG. 3E is an exploded view of the narrow hot end from FIG. 3C.

FIG. 3E is an exploded view of the narrow hot end 310 from FIG. 3C. Each of the following components is shown: air ducting 308, heat sink 316, guide tube 334, thermal barrier 332, heater 330, and nozzle 318. Also shown is a connector 340, which is used to attach the nozzle 318 to a material delivery channel of the hot end. In some implementations, a connector 340 is made to receive different types of nozzles, providing flexibility in the use of different nozzles with the hot end. The connector 340 can be independently attachable to the hot end and to different nozzles, or the connector 340 can be affixed to the hot end and attach different nozzles thereto. In any case, the connector 340 is also contained within the volume defined by the total included angle with respect to the nozzle target point. In some implementations, the range of attachable nozzles is used in defining the total included angle and the volume. In some implementations, different amounts of the hot end can be removably attachable to the rest of the hot end or other parts of a 3D printing system.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Thus, particular embodiments of the invention have been described. Other embodiments are within the scope of the following claims. In addition, the actions recited in the claims can be performed in a different order and still achieve desirable results.

What is claimed is:

1. A hot end associated with an extruder for a Fused Filament Fabrication (FFF) three dimensional (3D) printer, the hot end comprising:
   a heater;
   a temperature sensor coupled with the heater;
   an FFF material delivery channel;
   a heat sink coupled with the FFF material delivery channel;
   a nozzle coupled with the FFF material delivery channel and with the heater, the nozzle having a total included angle of less than or equal to sixty degrees and greater than or equal to ten degrees, with respect to a nozzle target point; and
   a cooling delivery system for at least the heat sink;
   wherein the heat sink, the heater, the temperature sensor, the FFF material delivery channel, the nozzle, and the cooling delivery system are all contained within a volume defined by the total included angle with respect to the nozzle target point.

2. The hot end of claim 1, wherein the nozzle is coupled with the FFF material delivery channel through a connector configured to receive different types of nozzles, and the connector is also contained within the volume defined by the total included angle with respect to the nozzle target point.

3. The hot end of claim 2, comprising a thermal barrier coupled with the heat sink and the FFF material delivery channel, wherein the thermal barrier is also contained within the volume defined by the total included angle with respect to the nozzle target point, and the cooling delivery system comprises air ducting configured and arranged to direct blown air to both the heat sink and material extruded by the nozzle.

4. The hot end of claim 3, wherein the total included angle with respect to the nozzle target point is less than or equal to sixty degrees and greater than or equal to thirty degrees.

5. The hot end of claim 4, comprising a fan to generate the blown air for the cooling delivery system, wherein the fan is also contained within the volume defined by the total included angle.

6. The hot end of claim 5, comprising a motor to drive FFF filament into the FFF material delivery channel, wherein the motor is also contained within the volume defined by the total included angle.

7. The hot end of claim 4, wherein the nozzle has an exit orifice with a size, and the volume is the volume of a cone defined by the total included angle and a cone height between fifty times and two hundred and fifty times the size of the exit orifice.

8. The hot end of claim 1, wherein the total included angle is less than or equal to forty five degrees and greater than or equal to thirty degrees.

9. The hot end of claim 8, comprising a thermal barrier, wherein the thermal barrier is also contained within the volume defined by the total included angle with respect to the nozzle target point.

10. The hot end of claim 9, wherein the cooling delivery system comprises air ducting configured and arranged to direct blown air to both the heat sink and material extruded by the nozzle.

11. The hot end of claim 10, wherein the air ducting comprises separate air ducts for the heat sink and the material extruded by the nozzle, the separate air ducts configured and arranged to receive blown air at different flow rates from different fans.

12. The hot end of claim 9, wherein the cooling delivery system is configured and arranged to cool both the heat sink and the thermal barrier.

13. The hot end of claim 9, wherein the cooling delivery system comprises a heat pipe.

14. The hot end of claim 9, wherein the cooling delivery system comprises a liquid cooled system.

15. An extruder for a Fused Filament Fabrication (FFF) three dimensional (3D) printer comprising:
   a heat sink;
   a thermal barrier coupled with the heat sink;
   a heater coupled with the thermal barrier;
   a temperature sensor coupled with the heater;
   an FFF material delivery channel;
   a motor to drive FFF filament into the FFF material delivery channel;
   a nozzle coupled with the FFF material delivery channel and with the heater, the nozzle having a total included angle of less than or equal to sixty degrees and greater than or equal to ten degrees, with respect to a nozzle target point; and
   a cooling delivery system for at least the heat sink;
   wherein the heat sink, the heater, the temperature sensor, the FFF material delivery channel, the nozzle, and the cooling delivery system are all contained within a volume defined by the total included angle with respect to the nozzle target point.

16. The extruder of claim 15, wherein the thermal barrier and the motor are also contained within the volume defined by the total included angle with respect to the nozzle target point.

17. The extruder of claim 16, wherein the total included angle is less than or equal to forty five degrees and greater than or equal to thirty degrees.

18. A Fused Filament Fabrication (FFF) three dimensional (3D) printer comprising:
   a build platform;
   a 3D printer motion system;
   a carriage coupled with the 3D printer motion system; and
   a hot end coupled with the carriage;
   wherein the hot end comprises a heater, a temperature sensor coupled with the heater, an FFF material delivery channel, a heat sink coupled with the FFF material delivery channel, a nozzle coupled with the FFF material delivery channel and with the heater, and a cooling delivery system for at least the heat sink;
   wherein the nozzle has a total included angle of less than or equal to sixty degrees and greater than or equal to ten degrees, with respect to a nozzle target point; and
   wherein the heat sink, the heater, the temperature sensor, the FFF material delivery channel, the nozzle, and the cooling delivery system are all contained within a volume defined by the total included angle with respect to the nozzle target point.

19. The FFF 3D printer of claim 18, wherein the carriage is also contained within the volume defined by the total included angle with respect to the nozzle target point.

20. The FFF 3D printer of claim 18, wherein the 3D printer motion system has more than three degrees of freedom, and the FFF 3D printer is configured to move the carriage and the hot end along three dimensional tool paths.

* * * * *